(12) United States Patent
Sumter et al.

(10) Patent No.: US 10,162,896 B1
(45) Date of Patent: *Dec. 25, 2018

(54) EVENT STREAM ARCHITECTURE FOR SYNCING EVENTS

(71) Applicant: Google Inc., Mountain View, CA (US)

(72) Inventors: George Cody Sumter, Mountain View, CA (US); Alan Lee Gardner, III, Mountain View, CA (US); Nadav Aharony, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 349 days.

This patent is subject to a terminal disclaimer.

(21) Appl. No.: 14/622,772

(22) Filed: Feb. 13, 2015

Related U.S. Application Data

(60) Provisional application No. 61/941,476, filed on Feb. 18, 2014.

(51) Int. Cl.
G06F 7/00 (2006.01)
G06F 17/30 (2006.01)
H04L 29/08 (2006.01)

(52) U.S. Cl.
CPC .. *G06F 17/30864* (2013.01); *G06F 17/30705* (2013.01); *H04L 67/1095* (2013.01); *H04L 67/32* (2013.01)

(58) Field of Classification Search
None
See application file for complete search history.

(56) References Cited

U.S. PATENT DOCUMENTS

| 8,254,953 | B2 | 8/2012 | Mcbride et al. | |
|---|---|---|---|---|
| 2002/0069419 | A1 | 6/2002 | Raverdy et al. | |
| 2004/0248653 | A1 | 12/2004 | Barras et al. | |
| 2008/0159178 | A1* | 7/2008 | Syrjanen | H04L 12/1827 370/261 |
| 2011/0271213 | A1* | 11/2011 | Newman | H04L 12/1822 715/758 |
| 2013/0227596 | A1* | 8/2013 | Pettis | H04N 21/2353 725/13 |
| 2013/0311482 | A1* | 11/2013 | Schleier-Smith | G06F 17/30551 707/746 |
| 2013/0336628 | A1* | 12/2013 | Lamb | H04N 9/79 386/224 |

OTHER PUBLICATIONS

Kovach, Steve, "How to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

* cited by examiner

*Primary Examiner* — Tuan A Pham
(74) *Attorney, Agent, or Firm* — Patent Law Works LLP

(57) ABSTRACT

A system and associated methods for generating a temporal event stream for a user is disclosed. The system includes a processor and a memory storing instructions that when executed cause the system to: receive a signal stream from a user device, determine one or more events from the signal stream, generate a first event stream based on the one or more events, generate one or more queries based on the signal stream, retrieve new events by applying the one or more queries against data stored by an event server and update the first event stream with the new events.

19 Claims, 10 Drawing Sheets

EVENT STREAM ARCHITECTURE FOR SYNCING EVENTS

CROSS REFERENCE TO RELATED APPLICATIONS

The present application claims priority, under 35 U.S.C. §119, of U.S. Provisional Patent Application No. 61/941,476, filed Feb. 18, 2014 and entitled "Event Stream Architecture for Syncing Events," which is incorporated by reference in its entirety.

BACKGROUND

A user's real world digital experience produces a torrent of user data suitable for analysis and for use by different services and applications, for example, from life journaling to personalization of a digital experience. However, in order to capture the real-world human-level behavioral context of the user, the user would usually be forced to manually enter that context. Automated ways of documenting and annotating the human-level experience in a digital manner are largely nonexistent. Oftentimes, the user provided context is insufficient and inefficient.

SUMMARY

In some embodiments, the specification describes a computer-implemented method comprising: receiving a signal stream from a first user device, determining one or more events from the signal stream, generating a first event stream based on the one or more events, generating one or more queries based on the signal stream, retrieving new events by applying the one or more queries against data stored in an event stream and updating the first event stream with the new events.

In some embodiments, the operations further include receiving the signal stream at the event server, identifying a type of data in the signal stream and generating the one or more queries based on the type of data identified in the signal stream. The operations further include receiving the first event stream at the event server from the first user device, updating the first event stream with the new events retrieved using the one or more queries, storing the updated first event stream at the event server and synchronizing the first event stream locally on the first user device with the updated first event stream received from the event server. The operations further include clustering the one or more events associated with a first user of the first user device and categorizing the first user based on the clustering of the one or more events. The operations further include receiving a second signal stream from a second user device, determining one or more events from the second signal stream, determining an overlapping event between the first user and a second user and responsive to determining the overlapping event, updating the first event stream with the one or more events determined from the second signal stream. The operations further include generating analytics data using the one or more queries, and transmitting for display a visualization of the analytics data to the first user device.

In some embodiments, the features further include the signal stream being consolidated from a first stream of hardware raw data and a second stream of raw software data. The features further include the data stored in the event server comprising one or more of aggregated data received from the first user device, historical data associated with the first user device and data of a plurality of users connected to the first user on a social graph in a social network server. The features further include the one or more events comprising one or more of person detection in close proximity, media syncing, location change determination and social network profile update.

The specification describes an event application that advantageously aggregates streams of raw hardware and software data for consolidating a signal stream and creating a temporal event stream describing one or more events processed from the signal stream. The event application also augments the event stream with additional events retrieved using one or more queries generated based on a type of data within the signal stream. Furthermore, the event application generates analytics data based on the analysis of the aggregated data and transmits for display a visualization of the analytics data.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
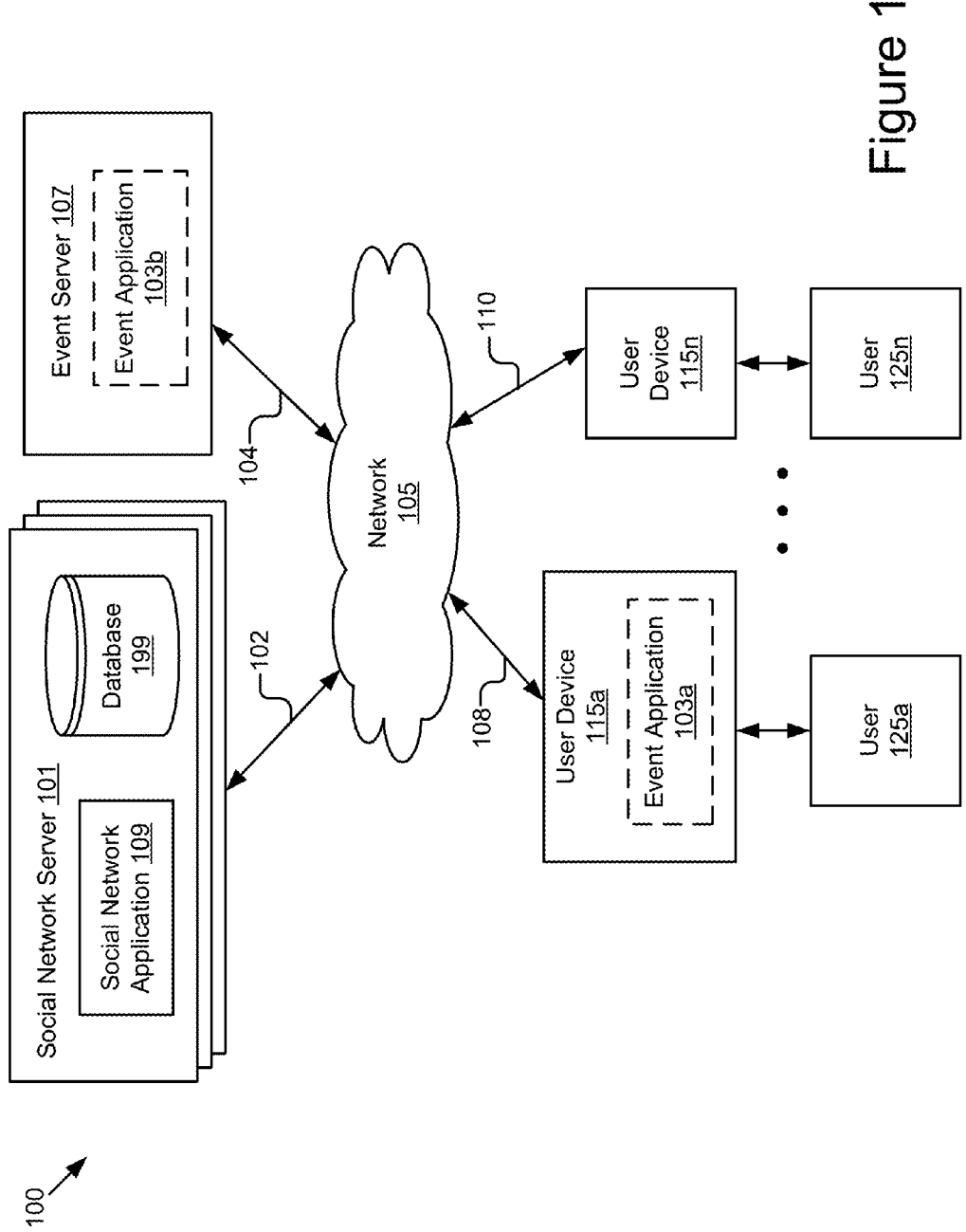
FIG. 1 is a block diagram illustrating an example of a system for generating a temporal event stream from a signal stream.

FIG. 1 illustrates a block diagram of a system 100 for generating a temporal event stream from signal streams. The illustrated description of the system 100 includes user devices 115*a* . . . 115*n* that are accessed by users 125*a* . . . 125*n*, one or more social network servers 101 and an event server 107. In the illustrated embodiment, these entities of the system 100 are communicatively coupled via a network 105. In FIG. 1 and the remaining figures, a letter after a reference number, for example "115*a*" is a reference to the element having that particular reference number. A reference number in the text without a following letter, for example "115," is a general reference to any or all instances of the element bearing that reference number.

The network 105 can be a conventional type network, wired or wireless, and may have any number of configurations for example a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or includes portions of a telecommunications network for sending data in a variety of different communication protocols. In other embodiments, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, in practice one or more networks 105 may be coupled to the above mentioned entities.

The social network server 101 can be a hardware server that includes a processor, a memory and network communication capabilities. The social network server 101 is communicatively coupled to the network 105 via signal line 102. In some embodiments, the social network server 101 sends and receives data to and from one or more of the user devices 115a, 115n and the event server 107 via the network 105. The social network server 101 includes a social network application 109 and a database 199.

A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. The social network application 109 in the social network server 101 manages the social network by handling registration of users, publication of content (e.g. posts, comments, photos, links, check-ins, etc.), hosting multi-user communication sessions, managing of groups, managing different sharing levels, updating the social graph, etc. The social network engine 203 registers a user by receiving information such as a username and password and generates a user profile that is associated with the user and stored as part of the social graph. In some embodiments, the user profile includes additional information about the user including interests (e.g. soccer, reading, food, subscriptions, etc.), activities (e.g. search history, indications of approval, posts, comments, multi-user communication sessions, etc.), demographics (e.g. age, ethnicity, location, etc.) and profile rating and reputation ((e.g., intelligence rating, humor rating, etc.). The database 199 in the social network server 101 stores social network data associated with the users. For example, the database 199 stores social network data describing one or more of user profiles, posts, comments, videos, audio files, images, sharings, acknowledgements, etc., published on a social network. The system 100 may include multiple social network servers 101 that include traditional social network servers, email servers, micro-blog servers, blog servers, forum servers, message servers, etc.

Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

The user devices 115a, 115n in FIG. 1 are used by way of example. Although only two user devices 115 are illustrated, the disclosure applies to a system architecture having any number of user devices 115 available to any number of users 125. In the illustrated implementation, the user 125a interacts with the user device 115a. In some embodiments, the event application 103a can be stored on the user device 115a which is communicatively coupled to the network 105 via signal line 108. The user 125n interacts with the user device 115n. The user device 115n is communicatively coupled to the network 105 via signal line 110.

In some embodiments, the user device 115 can be any computing device that includes a memory and a processor. For example, the user devices 115 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 105, etc.

In some embodiments, the user device 115 can include a mobile device that is worn by the user 125. For example, the user device 115 is included as part of a clip (e.g., a wristband), as part of a jewelry or as part of a pair of glasses. In another example, the user device 115 can be a smart watch. The user 125 can view notifications from the event application 103 on a display of the device worn by the user 125. For example, the user 125 can view the notifications on a display of a smart watch or a smart wristband. In another example, the user 125 can view the notifications on an optical head-mounted display of a pair of glasses. The user 125 may also configure what types of notifications to be displayed on the device worn by the user 125. For example, the user 125 may configure the wearable device to flash a LED light for 5 seconds if a friend's mobile device is detected in proximity to the user 125.

In some embodiments, the event application 103 can be split into some components that are stored on the user device 115a and some components that are stored on the event server 107. For example, the event application 103a on the user device 115a acts in part as a thin-client application and sends an event stream including one or more events associated with a user to the event application 103b on the event server 107. The event application 103b on the event server 107 augments the event stream by including new events and sends back the updated event stream to the event application 103a on the user device 115a for presenting the event stream to the user 125a.

In some embodiments, the event application 103b can be stored on an event server 107, which is connected to the network 105 via signal line 104. In some embodiments, the event server 107 can be a hardware server that includes a processor, a memory and network communication capabilities. The event server 107 sends and receives data to and from other entities of the system 100 via the network 105. While FIG. 1 illustrates one event server 107, the system 100 may include one or more event servers 107.

The event application 103 can be software including routines for generating temporal event streams for users. In some embodiments, the event application 103 can be implemented using hardware including a field-programmable gate array (FPGA) or an application-specific integrated circuit (ASIC). In some other embodiments, the event application 103 can be implemented using a combination of hardware and software. In some embodiments, the event application 103 may be stored in a combination of the devices and servers, or in one of the devices or servers. The event application 103 is described in further detail below with reference to FIGS. 2A-2B.

Figure 2A:
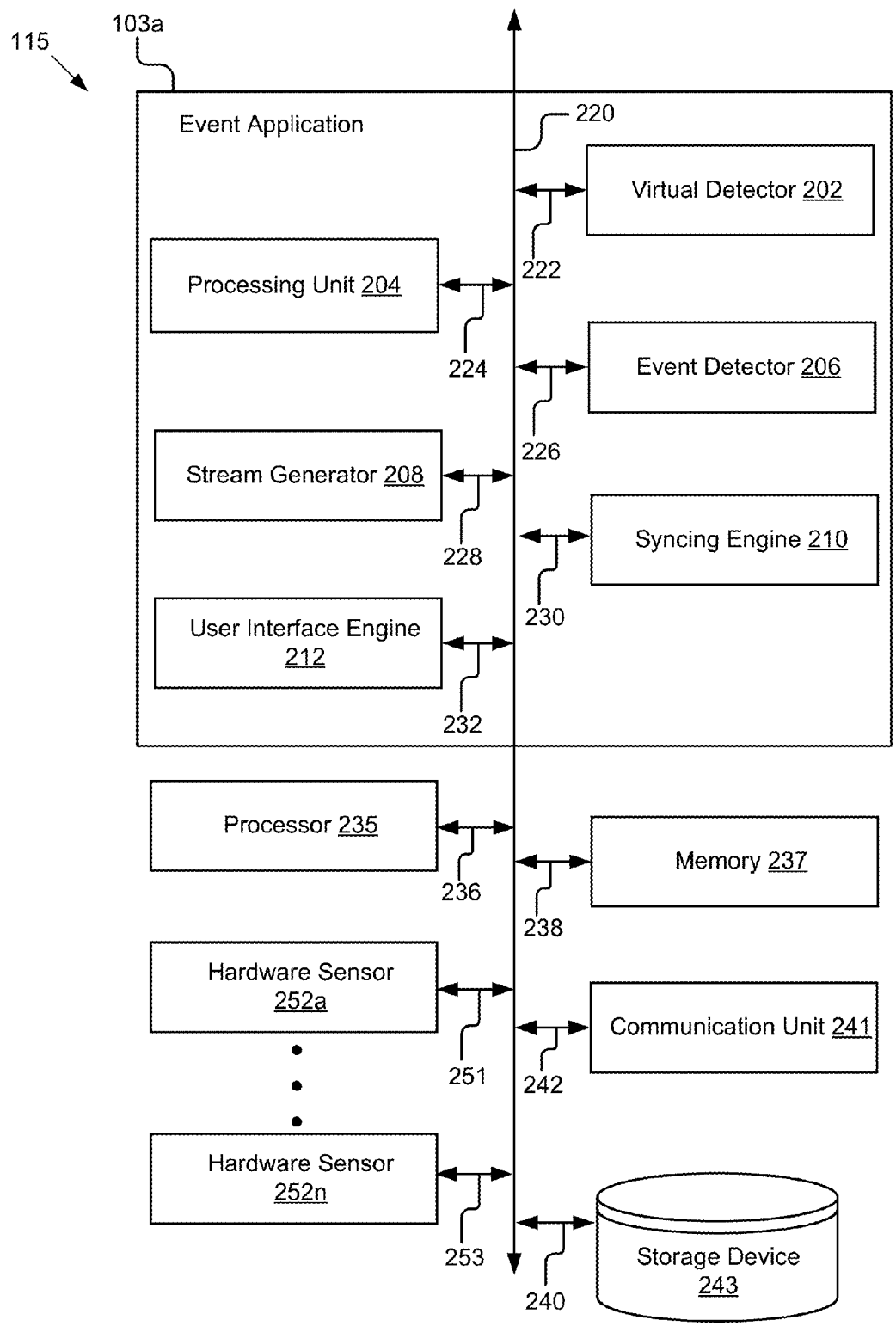
FIG. 2A is a block diagram illustrating an example of an event application.

Referring now to FIG. 2A, a block diagram of a user device 115 is illustrated that includes a processor 235, a memory 237, a communication unit 241, a storage device 243 and one or more hardware sensors 252*a* . . . 252*n* according to some examples. The components of the user device 115 are communicatively coupled by a bus 220.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors 235 may be included. The processing capability may be limited to supporting the display of images and the capture and transmission of images. The processing capability might be enough to perform more complex tasks, including various types of feature extraction and sampling. In practice, other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115, the event server 107 and the social network server 101 depending upon where the event application 103 is stored. The communication unit 241 is coupled to the bus 220 via signal line 242. In some embodiments, the communication unit 241 includes a port for direct physical connection to the network 105 or to another communication channel. For example, the communication unit 241 includes a USB, SD, CAT-5 or similar port for wired communication with the user device 115. In other embodiments, the communication unit 241 includes a wireless transceiver for exchanging data with the user device 115 or any other communication channel using one or more wireless communication methods, such as IEEE 802.11, IEEE 802.16, BLUETOOTH® or another suitable wireless communication method.

In some embodiments, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In other embodiments, the communication unit 241 includes a wired port and a wireless transceiver. The communication unit 241 also provides other conventional connections to the network for distribution of files and/or media objects using standard network protocols such as TCP/IP, HTTP, HTTPS and SMTP as will be understood to those skilled in the art.

The storage device 243 can be a non-transitory memory that temporarily stores data used by the event application 103, for example, a cache. The storage device 243 may be a dynamic random access memory (DRAM) device, a static random access memory (SRAM) device, flash memory or some other memory device known in the art. In some embodiments, the storage device 243 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated embodiment, the storage device 243 is communicatively coupled by the bus 220 for communication with the other components of the computing device 200 via signal line 240. Although only one storage device 243 is shown in FIG. 2, multiple storage devices 243 may be included. In other embodiments, the storage device 243 may not be included in the user device 115 and can be communicatively coupled to the user device 115 via the network 105.

In the illustrated embodiment, the storage device 243 stores one or more of hardware raw data, software raw data, filtered signal streams, one or more events and event streams associated with the user of the user device 115. The data stored in the storage device 243 is described below in more detail. In some embodiments, the storage device 243 may store other data for providing the functionality described herein.

The hardware sensors 252*a* . . . 252*n* can be sensors of conventional type. Example hardware sensors 252 include, but are not limited to, an infrared sensor, an accelerometer, a pedometer, a global positioning system (GPS) sensor, a Bluetooth sensor, a power detector, a battery detector, a camera, a light detection and ranging (LIDAR) sensor, a motion sensor, a capacitive sensor, a thermostat and a microphone, etc. Other example hardware sensors 252 are possible. The hardware sensor 252*a* is communicatively coupled to the bus 220 via signal line 251, and the hardware sensor 252*n* is communicatively coupled to the bus 220 via signal line 253.

In some embodiments, the one or more hardware sensors 252 generate sensor data and send the sensor data to a processing unit 204 of the event application 103*a* on the user device 115. The sensor data generated by the one or more hardware sensors 252 is referred to as hardware raw data. Example hardware raw data includes, but is not limited to, data describing number of steps from a pedometer, data describing a geographic location (e.g., a latitude, a longitude and an elevation of a location) and a velocity from a GPS sensor, data describing presence of other devices in close proximity to the user device 115 from a Bluetooth sensor, data describing a movement from an accelerometer (for e.g., the user device 115 is being held in a certain orientation while watching a video, playing a video game, etc.), data describing brightness in an environment from a light detector, data describing detecting ambient sounds from a microphone, data describing detecting wireless access points from wireless transceivers, etc. Other example hardware raw data is possible. In some embodiments, the one or more hardware sensors 252 generate the hardware raw data with permission from the user and store the hardware raw data in the storage device 243.

In some embodiments, the event application 103a includes a virtual detector 202, a processing unit 204, an event detector 206, a stream generator 208, a syncing engine 210 and a user interface engine 212.

The virtual detector 202 can be software including routines for generating raw data. In some embodiments, the virtual detector 202 can be a set of instructions executable by the processor 235 to provide the functionality described below for generating raw data. In other embodiments, the virtual detector 202 can be stored in the memory 237 of the user device 115 and can be accessible and executable by the processor 235. The virtual detector 202 may be adapted for cooperation and communication with the processor 235 and other components of the user device 115 via signal line 222.

In some embodiments, the one or more hardware sensors 252 generate hardware raw data, and send the hardware raw data to the processing unit 204. The virtual detector 202 generates other raw data that is not related to hardware sensors 252, and sends the other raw data to the processing unit 204. The other raw data generated by the virtual detector 202 is referred to as virtual raw data. In some embodiments, the virtual detector 202 generates the virtual raw data with permission from the user. In some embodiments, the virtual detector 202 generates a stream of data based on processing data similar to the processing unit 204, which will described in more detail below (for example, a stream of data that is composed of state change detections). In some embodiments, the virtual detector 202 receives input signals from other virtual detectors, hardware sensors, or software signals. In some embodiments, there may exist a network of virtual detectors connected to one another.

Example virtual raw data includes, but is not limited to, software raw data related to software stored on the user device 115, mobile network information related to the user device 115's mobile network, file status on the user device 115, data describing interactions between the user and the user device 115 (e.g., the user turning up or turning down volume, brightness, contrast, etc. on the user device 115, the user zooming in or zooming out of content displayed on the user device 115, the user scrolling down on a touch screen or typing in a user interface, the user making a phone call using the user device 115, etc.), data describing user interactions on a social network (e.g., the user viewing a social stream on a social network; the user publishing a post, sharing a web page, posting a comment, viewing a video, listening to an audio file, playing an online game, submitting a survey, adding users as his or her connections, etc., on the social network), the user's online search history, the user's browsing history and the user's communication history (e.g., text messages, emails, etc.). In some embodiments, the virtual raw data is retrieved with permission from the user, etc. Other example virtual raw data is possible. In some embodiments, the virtual raw data includes metadata associated with the user device 115. Virtual raw data may also include raw data that is generated remotely, for example, by a nearby device or on a completely remote systems. Examples of raw data that is generated remotely may include raw data being generated by a mobile device such as a smart watch or from user activity on their television. Examples of raw data generated remotely may include user on a client device such as a laptop that affects something running on the user's mobile phone.

Example software raw data related to software stored on the user device 115 includes, but is not limited to, operating system information related to the user device 115 (e.g., the user updating the operating system, switching the operating system, etc.), applications stored on the user device 115 (e.g., applications for fitness tracking, counting calories, mobile payment, reading books, listening to music, etc.) and application usage information on the user device 115 (e.g., the user entering his or her gym routine into a fitness tracking application, opening a song playlist in a media library, closing an instant messaging application, deleting an unused application, updating an existing application, installing a new application, configuring an application setting, etc.). Other example software raw data is possible. In some embodiments, the virtual detector 202 stores the virtual raw data in the storage device 243.

The processing unit 204 can be software including routines for receiving streams of raw data from the virtual detector 202 and/or one or more hardware sensors 252. In some embodiments, the processing unit 204 can be a set of instructions executable by the processor 235 to provide the functionality described below for receiving streams of raw data from the virtual detector 202 and/or one or more hardware sensors 252. In other embodiments, the processing unit 204 can be stored in the memory 237 of the user device 115 and can be accessible and executable by the processor 235. The processing unit 204 may be adapted for cooperation and communication with the processor 235 and other components of the user device 115 via signal line 224.

In some embodiments, the processing unit 204 receives a stream of raw data from the virtual detector 202, where the stream includes virtual raw data generated by the virtual detector 202. In other embodiments, the processing unit 204 receives a stream of raw data from one or more hardware sensors 252, where the stream includes hardware raw data generated by the one or more hardware sensors 252. In some other embodiments, the processing unit 204 receives a stream of virtual raw data from the virtual detector 202 and a stream of hardware raw data from the one or more hardware sensors 252, where the stream of virtual raw data and the stream of hardware raw data together form a consolidated signal stream.

In some embodiments, the processing unit 204 stores the signal stream in the storage device 243. In other embodiments, the processing unit 204 sends the signals stream to the event server 107.

In some embodiments, the processing unit 204 validates the data in the signal stream for its usefulness. In some embodiments, the processing unit 204 saves a data block from the signal stream that indicates a change in state as when compared to a previous data block. For example, at a first timestamp, the processing unit 204 may receive a first set of location data from a GPS sensor indicating a user has just arrived at a coffee shop after coming out of a subway station, and the processing unit 204 may save the first set of location data. At a second timestamp, if the processing unit 204 receives, from the GPS sensor, a second set of location data which is identical to the first set of location data, indicating the user is at the same location as the first timestamp, the processing unit 204 does not save the second set of location data. However, at a third timestamp, if the processing unit 204 receives, from the GPS sensor, a third set of location data which is different from the second set of location data, indicating the user has left the coffee shop and is now in the office, the processing unit 204 saves the third set of location data. At the first timestamp, the user is in transit since the user just arrived at the coffee shop after coming out of a subway station; at the second timestamp, the user is stationary since the user is still at the coffee shop; at the third timestamp, the user is in transit again since the user has left the coffee shop and is now in the office. The processing unit 204 saves data related to the transit moments and ignores data related to the stationary moments.

In some examples, the processing unit 204 saves the data from the signal stream that indicate a change in a frequency of steps (for e.g., data from accelerometer), a change of velocity (for e.g., data from GPS sensor), a change of location (for e.g., data from a GPS sensor, a wireless transceiver, etc.), a change in application usage (e.g., an application being opened, used, closed, updated, installed, etc.), a change in actions performed on a social network (e.g., a user logging in, logging out, uploading a photograph, accepting invites, posting a comment, indicating an acknowledgement, adding other users as connections, etc.), a change related to detecting presence of other user devices 115n in close proximity of the user device 115a or other changes in state.

In some embodiments, the processing unit 204 splits the signal stream into data blocks defined by time categories and stores them accordingly in the storage device 243. For example, the processing unit 204 splits the data in the signal stream by time categories, such as, nights (e.g., 10 PM to 6 PM), weekdays (i.e., Monday to Friday), work hours (e.g., 9 AM to 5 PM), weekends (e.g., Sunday), a time frame (e.g., Sunday between 3 PM-5 PM), etc.

In some embodiments, the processing unit 204 filters the signal stream to define one or more human-understandable actions. For example, the processing unit 204 filters the signal stream to retrieve data describing a number of steps from the accelerometer of the user device 115 and outputs a filtered signal stream including step data. In another example, the processing unit 204 filters the signal stream to retrieve sequence of location and velocity data from a GPS sensor of the user device 115 and outputs a filtered signal stream including location data. In yet another example, the processing unit 204 filters the signal stream to retrieve data describing detection of a mobile device in close proximity to the user device 115 and outputs a filtered signal stream including detection data. Such a filtered signal stream includes hashed identifiers (i.e. hashed using phone, email, social network profile identifier, etc.) associated with the mobile device in close proximity of the user device 115. In some embodiments, the virtual detector 202 (or a network of virtual detectors) performs the functions described above.

In some embodiments, the processing unit 204 filters the signal stream to define changes in one or more human understandable actions. For example, assume a Bluetooth sensor on a user's mobile device is detecting presence of a number of mobile devices in close proximity of the user every five minutes from 1:00 PM to 1:30 PM. The processing unit 204 filters the data generated by the Bluetooth sensor and outputs a filtered signal stream that includes (1) data indicating detection of a first mobile device and a second mobile device in proximity of the user at 1:00 PM, and (2) data indicating detection that the second mobile device is no longer in proximity of the user at 1:25 PM. In another example, assume a GPS sensor on a user's mobile device is updating location of the user every 2 minutes from 8:00 AM to 8:30 AM. The processing unit 204 filters the data generated by the GPS sensor and outputs a filtered signal stream that includes (1) a first set of location and timestamp describing the user arrived at a coffee shop at 8:04 AM and (2) a second set of location and timestamp data describing the user left the coffee shop at 8:30 AM. Other sets of location and timestamp data received from the GPS sensor between 8:00 AM and 8:30 AM are not included in the filtered signal stream because they are identical. In some embodiments, the virtual detector 202 (or a network of virtual detectors) performs the functions described above.

In some embodiments, the processing unit 204 filters the signal stream to combine different types of data in a filtered signal stream to define one or more human understandable actions. For example, the processing unit 204 outputs a filtered signal stream that combines one or more of the following data including: (1) location and velocity data from a GPS sensor, and (2) detection data indicating presence of an automobile (e.g., Bluetooth enabled) and a mobile in close proximity, etc. to indicate travelling together with another user. In another example, the processing unit 204 outputs a filtered signal stream that combines one or more of the following data including: (1) ambient sound data from a microphone, (2) location data from a GPS sensor or Wi-Fi access point, and (3) uploading one or more pictures with GPS tags matching the location data to the social network, etc. to indicate a social gathering. In yet another example, the processing unit 204 outputs a filtered signal stream that combines one or more of the following data including: (1) motion data from an accelerometer, (2) ambient illumination data from a light sensor, (3) energy usage data from a power detector on the user device 115, and (4) application usage data from an application manager in the user device 115, etc. to indicate sleeping or active day time activity. In some embodiments, the virtual detector 202 (or a network of virtual detectors) performs the functions described above.

In some embodiments, the processing unit 204 provides the filtered signal stream to applications stored on the user device 115. For example, the step data from the filtered stream is input to a fitness tracking application. In other embodiments, the processing unit 204 stores the filtered signal stream in the storage device 243. In some other embodiments, the processing unit 204 sends the filtered signal stream to the event server 107.

The event detector 206 can be software including routines for identifying one or more events in the filtered signal stream. In some embodiments, the event detector 206 can be a set of instructions executable by the processor 235 to provide the functionality described below for identifying one or more events. In other embodiments, the event detector 206 can be stored in the memory 237 of the user device 115 and can be accessible and executable by the processor 235. The event detector 206 may be adapted for cooperation and communication with the processor 235 and other components of the user device 115 via signal line 226.

In some embodiments, the event detector 206 retrieves data describing a user profile and social graph from the social network server 101 with permission from the user. The user profile includes one or more of the user's age, gender, relationships, educational background, work experience, interests and other demographic information.

In some embodiments, the event detector 206 receives the filtered signal stream from the processing unit 204 and determines one or more activities from the filtered signal stream.

For example, the event detector 206 receives a filtered signal stream that includes step data from an accelerometer and the event detector 206 determines that the user of the user device 115 is either walking or running depending on the frequency of steps determined in the step data. In another example, the event detector 206 receives a filtered signal stream that includes (1) step data from an accelerometer (2) application usage data indicating playing a playlist from a music library application, and (3) proximity detection data indicating presence of a friend's mobile device in close proximity from a Bluetooth sensor and the event detector 206 determines that the user is jogging with the friend. In another example, the event detector 206 receives a filtered signal stream that includes (1) application usage data from a game application, (2) orientation data indicating portrait or landscape mode of operation from an accelerometer, and (3) capacitive sensing data measuring swiping or pinching motions on a touch screen from the capacitive sensors and the event detector 206 determines that the user is engaged in a gaming activity. In yet another example, the event detector 206 receives a filtered signal stream that includes (1) proximity detection data indicating a presence of a spouse's mobile device and a Bluetooth enabled television set in close proximity from a Bluetooth sensor and (2) a location and timestamp data indicating a house from a GPS sensor and the event detector 206 determines that the user is at home watching television with a spouse. Other example activities include, but are not limited to, social network activity (for e.g., creating a user connection, making a comment, indicating an acknowledgement, sharing posts, etc.).

In some embodiments, the event detector 206 identifies a social aspect for one or more activities identified in the filtered signal stream for the user. The social aspect defines who the user is with during the identified activity. For example, the social aspect of the user having a dinner with friends at a restaurant. In other embodiments, the event detector 206 identifies an attention aspect for the one or more activities identified in the filtered signal stream for the user. The attention aspect defines what the user is concentrating on during an activity. For example, the attention aspect of the user playing a video game to get a high score, sleeping for eight hours, talking on the phone for 15 minutes, etc. In some other embodiments, the event detector 206 identifies a mobility aspect for the one or more activities identified in the filtered signal stream for the user. The mobility aspect defines what the state of the user is during an activity. For example, the mobility aspect of the user driving a car, walking, running, being home, working at the office, etc.

In some embodiments, the event detector 206 receives from the syncing engine 210 a list of known user devices 115 to scan for Bluetooth hits indicating presence. The syncing engine 210 is described below in greater detail. The event detector 206 polls for the list of known user devices 115 by filtering the Bluetooth detection of available devices in close proximity. For example, the event detector 206 outputs a filtered signal stream that identifies a group of user devices 115 belonging to the user's connections on the social network. In another example, the event detector 206 outputs a filtered signal stream that identifies a group of user devices 115 belonging to strangers (separated by a certain degree of separation from the user) at the same location as the user. In yet another example, the event detector 206 outputs a filtered signal stream that identifies a group of user devices 115 belonging to the user's connections and strangers at the same location as the user.

In some embodiments, the event detector 206 aggregates one or more activities to define an event related to the user. An event describes a story including personal and social behavior of the user. In some embodiments, the event detector 206 generates an event including a single activity performed during a particular time period. For example, the event detector 206 generates an individual event describing a user's run of six and a half miles and a route of the run in a public park from 5:30 AM to 6:15 AM. In another example, the event detector 206 generates an individual event describing a user's sleep at home from 11 PM to 6 AM on a weekday. In other embodiments, the event detector 206 generates an event including multiple activities performed during a particular time period. For example, the event detector 206 generates a social event for the user's graduation party including the user meeting with people (e.g., siblings, friends, friend of a friend, etc.), dining at a restaurant together and uploading pictures of the celebration to the social network on a Friday evening from 7 PM to 11 PM. In another example, the event detector 206 generates a business event for the user's work related trip including the user taking a flight from a first city to a second city, staying at a five star hotel from Tuesday to Thursday, meeting with clients from 11 AM to 4 PM on Tuesday, uploading pictures of a tourist attraction in the second city on Wednesday and flying back to the first city on Thursday.

In some embodiments, the event detector 206 generates an event including one or more activities occurring at the same location. For example, the event detector 206 generates a state fair event including the user watching a musical performance at the state fair with family members, posting photographs of creative arts exhibits in the state fair to the social network, purchasing decorative pottery at a booth in the state fair and bumping into friends and colleagues at the state fair. In other embodiments, the event detector 206 generates an event including one or more activities related to a particular subject. For example, the event detector 206 generates a gaming achievement event including the user playing a multiplayer game with a friend for four hours, unlocking an achievement within the multiplayer game, sharing the achievement that was unlocked to the social network and posting comments challenging his friends to unlock the same achievement in the multiplayer game.

In some embodiments, the event detector 206 stores the one or more events generated for the user in the storage device 243. In other embodiments, the event detector 206 sends the one or more events to the event server 107.

The stream generator 208 can be software including routines for generating event streams. In some embodiments, the stream generator 208 can be a set of instructions executable by the processor 235 to provide the functionality described below for generating event streams. In other embodiments, the stream generator 208 can be stored in the memory 237 of the user device 115 and can be accessible and executable by the processor 235. The stream generator 208 may be adapted for cooperation and communication with the processor 235 and other components of the user device 115 via signal line 228.

In some embodiments, the stream generator 208 receives one or more events associated with the user from the event detector 206 and generates an event stream for the user based on the one or more events. An event stream can be data describing a temporal sequence of one or more events associated with the user. For example, an event stream can describe a sequence of events associated with a user in a day, a week or a month. In some embodiments, the stream generator 208 organizes the events in the event stream in a chronological order. For example, the user's events in the event stream for a regular weekday are organized in the following order starting with (1) jogging five and a half miles through Liberty public park from 5:30 AM to 6:03 AM, (2) buying coffee at the coffee shop at 8:47 AM, (3) driving to the office at 9:00 AM, (4) attending a business lunch at 12:00 PM with clients at a restaurant, (5) watching a movie at 9:00 PM with the spouse on the television in the house, and so on. In some embodiments, an event stream is the stored historical version of the output of the event detector 206. In some embodiments, the output of the stream generator 208 is defined in the same format as the virtual detector 202 and is set as input to other virtual detectors 202. In some embodiments, the output of the stream generator is similar to the output of a detected signal stream. In some embodiments, some signals have low level events, for instance, a screen being turned on or off, or applications that are running. In some embodiments, there are higher level event streams similar to what is describe above (a human level event stream of a person's day). There can be an even larger scale event streams about life changes, for example, getting married, having kids, or moving from one home to another.

In some embodiments, the stream generator 208 organizes the events in the event stream according to one or more of (1) the subject of the events (for e.g., football sporting events, technology exposition, state fairs, etc.), (2) the users participating in the events socially (for e.g., pub crawl, friend's birthday party, business lunch, family picnic, etc.), or (3) the locations related to the events (for e.g., working at the office, holidaying at a tourist destination, etc.).

In some embodiments, the stream generator 208 stores the event streams generated for the user in the storage device 243. In other embodiments, the stream generator 208 sends the event streams to the event server 107. In some embodiments, the event streams are generated on a user device 115, such as a mobile device or generated on a server based on data received from one or more devices or servers.

The syncing engine 210 can be software including routines for synchronizing the one or more events in the event streams. In some embodiments, the syncing engine 210 can be a set of instructions executable by the processor 235 to provide the functionality described below for synchronizing the one or more events. In other embodiments, the syncing engine 210 can be stored in the memory 237 of the user device 115 and can be accessible and executable by the processor 235. The syncing engine 210 may be adapted for cooperation and communication with the processor 235 and other components of the user device 115 via signal line 230.

In some embodiments, the syncing engine 210 receives one or more new events from the event server 107 and updates the event stream including one or more events received from the stream generator 208. For example, an event stream including an event describing the user bowling pins at a bowling alley is updated with a new event of a friend being detected in proximity of the user.

In some embodiments, the syncing engine 210 receives an updated event stream associated with the user from the event server 107. The syncing engine 210 retrieves the corresponding event stream that was generated locally by the stream generator 208 and synchronizes the corresponding event stream with the updated event stream received from the event server 107. For example, assume a first event stream of the user publishing photos of birds taken a bird sanctuary. The syncing engine 210 receives an updated first event stream including photos taken by a friend in proximity of the user at the bird sanctuary from the event server 107. The syncing engine 210 synchronizes the first event stream with the updated first event stream by acknowledging the friend detected nearby and syncing the photos taken by the friend with the user's photos.

In some embodiments, the syncing engine 210 receives analytics data from the event server 107 and transmits it to the event detector 206. For example, the analytics data includes a list of known user devices to scan for proximity presence around the user of the user device 115. In other embodiments, the syncing engine 210 receives analytics data for providing to the user for consumption. The syncing engine 210 instructs the user interface engine 212 to display, for example, statistical aggregation of the user's top locations, application usage statistics, etc.

The user interface engine 212 can be software including routines for generating graphical data for providing user interfaces to users. In some embodiments, the user interface engine 212 can be a set of instructions executable by the processor 235 to provide the functionality described below for generating graphical data for providing user interfaces to users. In other embodiments, the user interface engine 212 can be stored in the memory 237 of the user device 115 and is accessible and executable by the processor 235. The user interface engine 212 can be adapted for cooperation and communication with the processor 235 and other components of the user device 115 via signal line 232.

In some embodiments, the user interface engine 212 for providing a user that depicts a summary of events associated with the user. The user interface engine 212 sends the graphical data to a display of the user device 115, causing the user device 115 to present the user interface to the user. In some embodiments, the user interface engine 212 receives instructions from the event server 107 and generates graphical data for visualizing data analytics and other statistics to the user. Example user interfaces are shown in FIGS. 3-6.

Figure 2B:
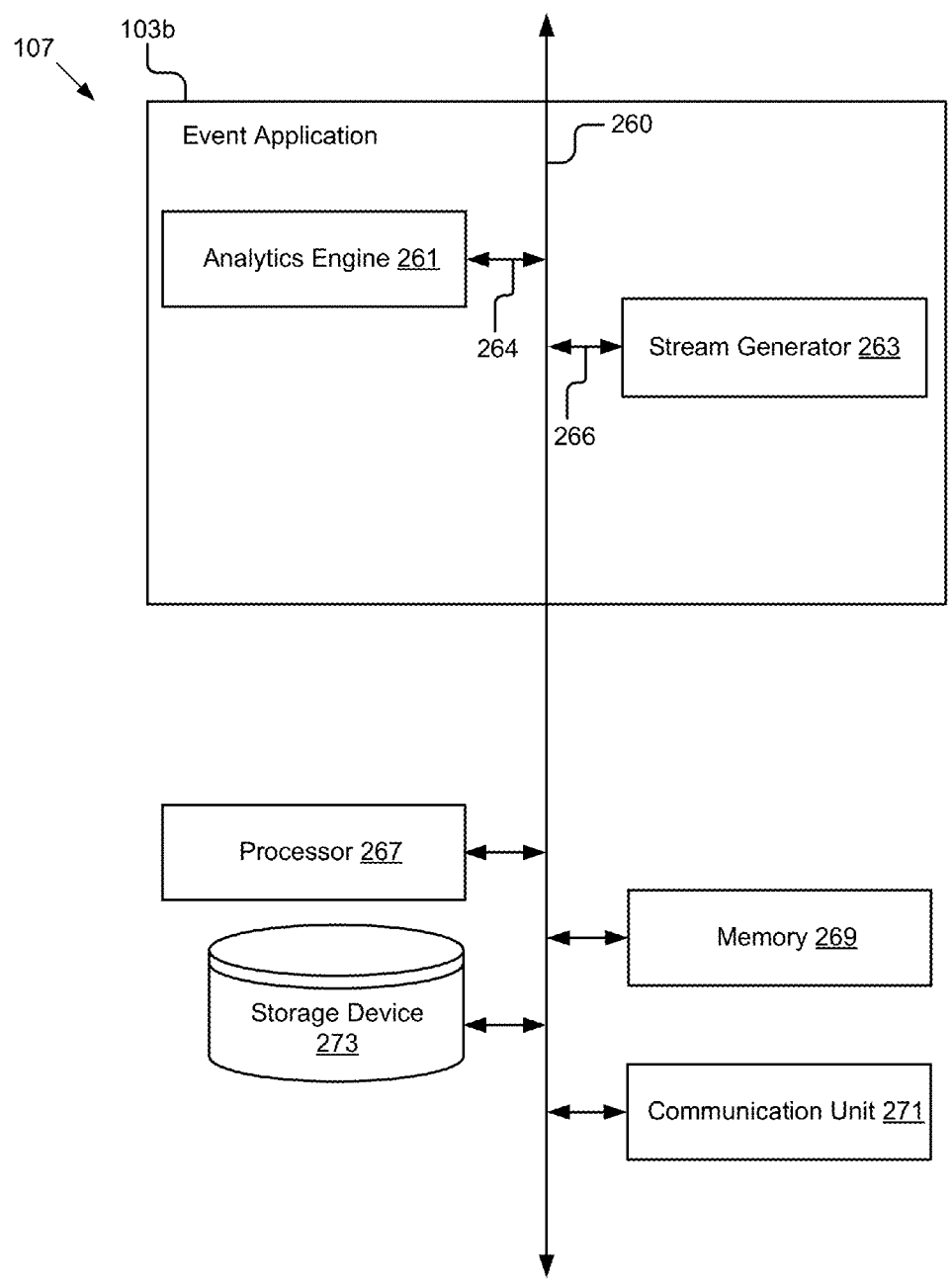
FIG. 2B is a block diagram illustrating another example of an event application.

Referring now to FIG. 2B, a block diagram of an event server 107 is illustrated that includes a processor 267, a memory 269, a communication unit 271 and a storage device 273 according to some examples. The components of the event server 107 are communicatively coupled by a bus 260. Some of the components of the event server 107 have similar function and form as has been described above with reference to FIG. 2A so like terminology has been used to indicate similar functionality. For example, the processor 267, the memory 269 and the communication unit 271 are similar to that described above with reference to FIG. 2A so they will not be described here again.

In some embodiments, the storage device 273 stores the social graph and user profile information of multiple users. In other embodiments, the storage device 273 stores data from multiple devices belonging to the same user. In other embodiments, the storage device 273 stores signal streams, events, event streams associated with multiple users. In some other embodiments, the storage device 273 stores statistical data analysis performed on the data received associated with the multiple users. The data stored in the storage device 273 is described below in more detail. In some embodiments, the storage device 273 can be a database and stores other data for providing the functionality described herein.

In some embodiments, the event application 103*b* includes an analytics engine 261 and a stream generator 263.

The analytics engine 261 can be software including routines for analyzing the signal streams and event streams received from the one or more user devices 115. In some embodiments, the analytics engine 261 can be a set of instructions executable by the processor 267 to provide the functionality described below for analyzing the signal streams and event streams received from the one or more user devices 115. In other embodiments, the analytics engine 261 can be stored in the memory 269 of the event server 107 and can be accessible and executable by the processor 267. The analytics engine 261 may be adapted for cooperation and communication with the processor 267 and other components of the event server 107 via signal line 264.

In some embodiments, the analytics engine 261 receives data including signal streams from the one or more user devices 115 (i.e., from the processing unit 204 of the event application 103a) and stores the data including the signals streams in the storage device 273. In other embodiments, the analytics engine 261 receives data including event streams from the one or more user devices 115 (i.e., from the stream generator 208) and stores the data including event streams in the storage device 273. For example, the analytics engine 261 stores the incoming data in the storage device 273 indexed against the time the data was generated. The incoming data could be indexed against time to be historical data or aggregated data for multiple users. In some embodiments, the analytics engine 261 retrieves data including social graph of multiple users from the social network server 101 with permission and stores the data in the storage device 273.

In some embodiments, the analytics engine 261 determines the type of data within the signal streams and the event streams. The analytics engine 261 determines one or more queries based on the type of data within the signal streams and the event streams.

In some embodiments, the analytics engine 261 uses the queries to retrieve data from the storage device 273 which is sent to the stream generator 263 described in detail below for updating the event stream with new events. In some embodiments, the analytics engine 261 transmits the data retrieved as new events to the syncing engine 210 in the event application 103a of the one or more user devices 115.

For example, the analytics engine 261 receives an event stream including Bluetooth proximity data that indicates a mobile device in close proximity. The proximity data includes a hashed identifier associated with the mobile device that is detected. The analytics engine 261 uses the hashed identifier as a query to retrieve the identity of the person to whom the mobile device is registered, such as, a friend, spouse, colleague, etc. from the storage device 273. The analytics engine 261 can retrieve additional data including the last time and location where they met each other and how they are connected (e.g., through mutual friends, having lived in the same city, gone to same school, etc.). The retrieved data including the identity could be an update to the event stream of detecting a familiar person in close proximity. The analytics engine 261 sends the retrieved identity to the stream generator 263.

In another example, the analytics engine 261 receives a first event stream including first set of photographs taken at a graduation party received from a first user. The analytics engine 261 also receives Bluetooth proximity data indicating other mobile devices in close proximity. The analytics engine 261 uses the Bluetooth proximity data to identify that a second user is present at the graduation party in the same room as the first user. The analytics engine 261 identifies that the second user as a friend of the first user. The analytics engine 261 uses the timestamp information from the photographs taken by the first user as a query to retrieve a second set of photographs in a second event stream associated with the second user in the recent past, since the time they were both detected to be in close proximity. The analytics engine 261 sends identity of the second user and the second set of photographs taken by the second user matching the query to the stream generator 263. Other examples of updating event streams are possible.

In some embodiments, the analytics engine 261 uses the queries on the data stored in the storage device 273 to generate analytics data. For example, the analytics engine 261 identifies data in the signal stream received from a user's mobile device to be new location data from a GPS sensor and creates a query to create or update a statistical aggregation regarding the user's top locations. The user's top locations (i.e. the locations which the user frequents most often) are locations aggregated historically for the user and could be ranked in the following order, (1) home, (2) work, (3) supermarket, (4) gym, (5) restaurant and so on. The new incoming location data can create new aggregation in the user's top locations.

In another example, the analytics engine 261 identifies new data in the signal stream received from a user's mobile device to be Bluetooth proximity data indicating a mobile device belonging to a friend in close proximity. The analytics engine 261 creates a query to create and/or update a list of mobile devices that are frequently in close proximity to the user's mobile device based on the new incoming proximity data. If the friend's mobile device is frequently detected in close proximity of the user's mobile device for a period of time, say 30 days, the friend's mobile device is added to the list of mobile devices to proactively scan for proximity presence in the future. If the friend's mobile device is never detected in close proximity for a period of time, say 50 days, the friend's mobile device is removed from the list of mobile devices. In some embodiments, the analytics engine 261 creates one or more lists of known user devices based on the social graph of the user and/or the user's location. For example, a first list of known user devices at a work location, a second list of known user devices at home, etc.

In some embodiments, the analytics engine 261 clusters the data received in the signal streams and event streams for the user in generating statistical data analytics. For example, the analytics engine 261 can determine the statistical distribution in the clustering of the user's top locations and categorize what kind of a person the user is. If the user's top locations are clustered in the following order: university campus (54%), student housing (30%), coffee shop (5%), bowling alley (3%), gym (3%), snow resort (2%), shopping malls (2%) and hospital clinic (1%), the analytics engine 261 categorizes the user as a student. In another example, the analytics engine 261 can determine the social clustering of people known to the user depending on the user's location. A first set of people detected (using mobile devices as proxies) in close proximity (using Bluetooth hits) of the user at work location can be clustered together as co-workers. A second set of people detected in close proximity of the user at home location can be clustered together as family members. In addition, a person with the most Bluetooth hits at home location, for example, can be identified as the user's partner or spouse.

In another example, the analytics engine 261 identifies application usage data in the signal stream received from the user's mobile device and creates a query to create and/or update the application usage statistics over time (a day, a week, a month, etc.) associated with the user. The application usage statistics describe: (1) what kind of applications are used frequently (for e.g., music library, fitness tracking, instant messaging, etc.) and their usage distribution (for e.g., music library (25 minutes), fitness tracking (32 minutes), instant messaging (50 minutes), etc.), (2) the time and location when the applications are used or updated (for e.g., at a coffee shop, on the weekends, during commutes, between 5 PM to 9 PM, etc.), and so on. Other example analytics data generation is possible.

In some embodiments, the analytics engine 261 instructs the user interface engine 212 in the event application 103a on the user device 114 to display the visualization of the analytics data. In one example, the visualization for data aggregated for a fitness tracking application could describe the changes in weight and other parameters through interactive graphs, pie charts, etc. for the user. In another example, the visualization of the user's top locations aggregation could include a geographical map pinpointing the user's most visited locations.

In some embodiments, the analytics engine 261 stores the generated analytics data in the storage device 273. In other embodiments, the analytics engine 261 sends the generated analytics data to the syncing engine 210 in the event application 103a of the one or more user devices 115.

The stream generator 263 can be software including routines for updating the event streams. In some embodiments, the stream generator 263 can be a set of instructions executable by the processor 267 to provide the functionality described below for updating event streams. In other embodiments, the stream generator 263 can be stored in the memory 269 of the event server 107 and can be accessible and executable by the processor 267. The stream generator 263 may be adapted for cooperation and communication with the processor 267 and other components of the event server 107 via signal line 266.

In some embodiments, the stream generator 263 receives the event streams partially populated from the one or more user devices 115 (i.e. from the stream generator 208) and updates the event streams with new events received from the analytics engine 261. For example, the stream generator 263 receives an event stream describing detection of a person in close proximity of a user. The stream generator 263 receives identity of the person (for e.g., a friend) from the analytics engine 261 and updates the event stream for the user with a text "Adam is nearby" and a profile photo of the user Adam. In another example, the stream generator 263 receives a first event stream with photographs of a graduation party from a first user. The stream generator 263 receives identity of a second user (e.g., a friend of the first user) detected in close proximity and a second event stream including photographs taken by the second user at the graduation party from the analytics engine 261. The stream generator 263 synchronizes the photographs taken by the first user with the photographs taken by the second user of the graduation party with permission from the first and the second users. In some embodiments, the stream generator 263 updates the first event stream with photographs from the second event stream and generates an updated first event stream. In other embodiments, the stream generator 263 updates the second event stream with photographs from the first event stream and generates an updated second event stream. In some other embodiments, the stream generator 263 generates a shared updated event stream using the first and the second event streams. Other example types of media content for synchronization are possible. In some embodiments, the stream generator 263 creates and stores the updated event streams for the users of the one or more user devices 115 in the storage device 273. In other embodiments, the stream generator 263 sends the updated event streams to the syncing engine 210.

Figure 3:
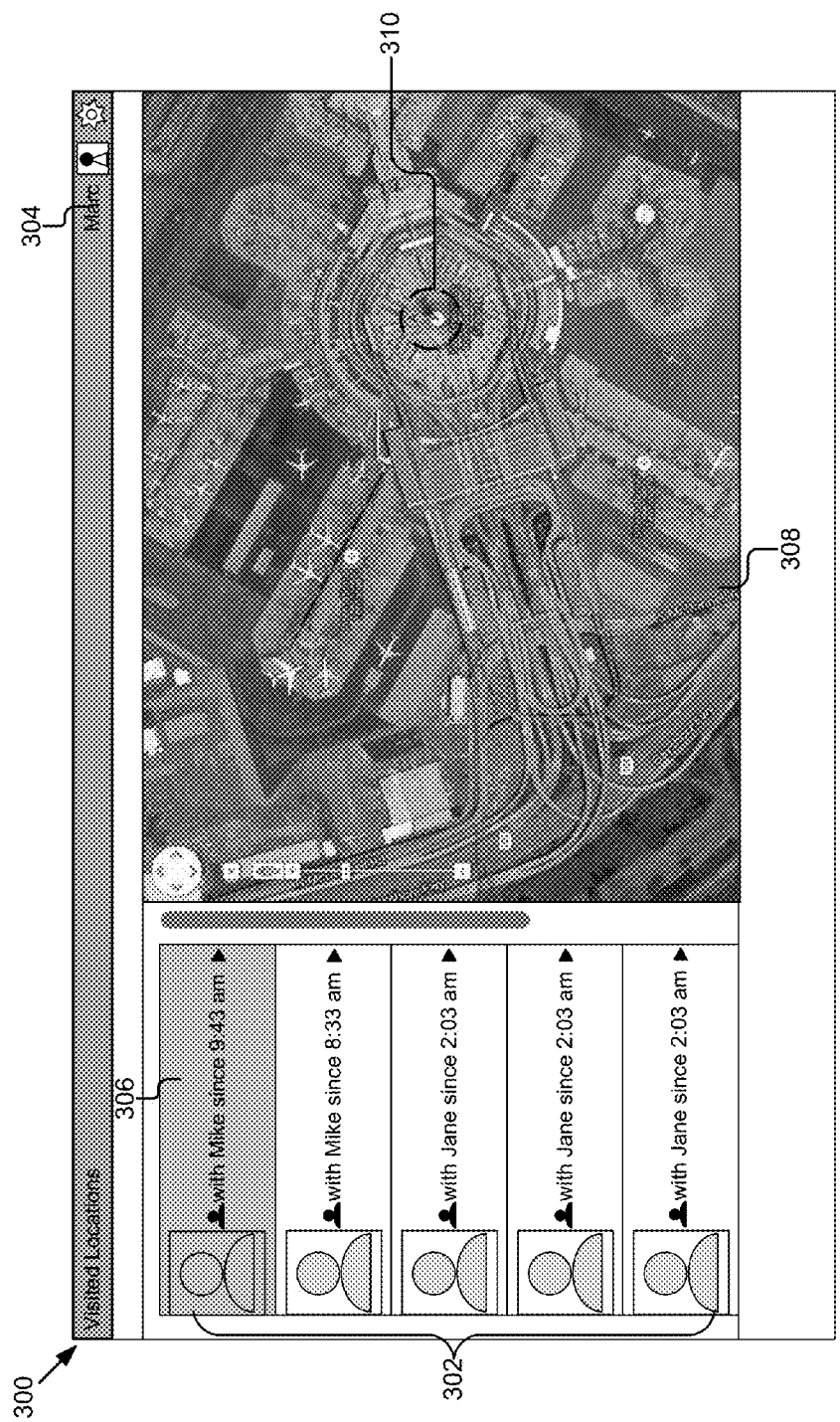
FIG. 3 is an example graphic representation of a user interface for displaying the locations visited by a user.

Turning now to FIG. 3, one example of a graphical representation of a user interface 300 for displaying the locations visited by a user is illustrated. The user interface 300 displays a list 302 of locations visited by the user 304. Each entry 306 of the list 302 includes photo of the person the user 304 is with at the location, a name of the person and a timestamp since they met at the location. Upon clicking the entry 306, the user interface 300 refreshes to display the map 308 of the location which the user 304 visited. In addition, the user interface 300 pinpoints the user location 310 on the map 308.

Figure 4:
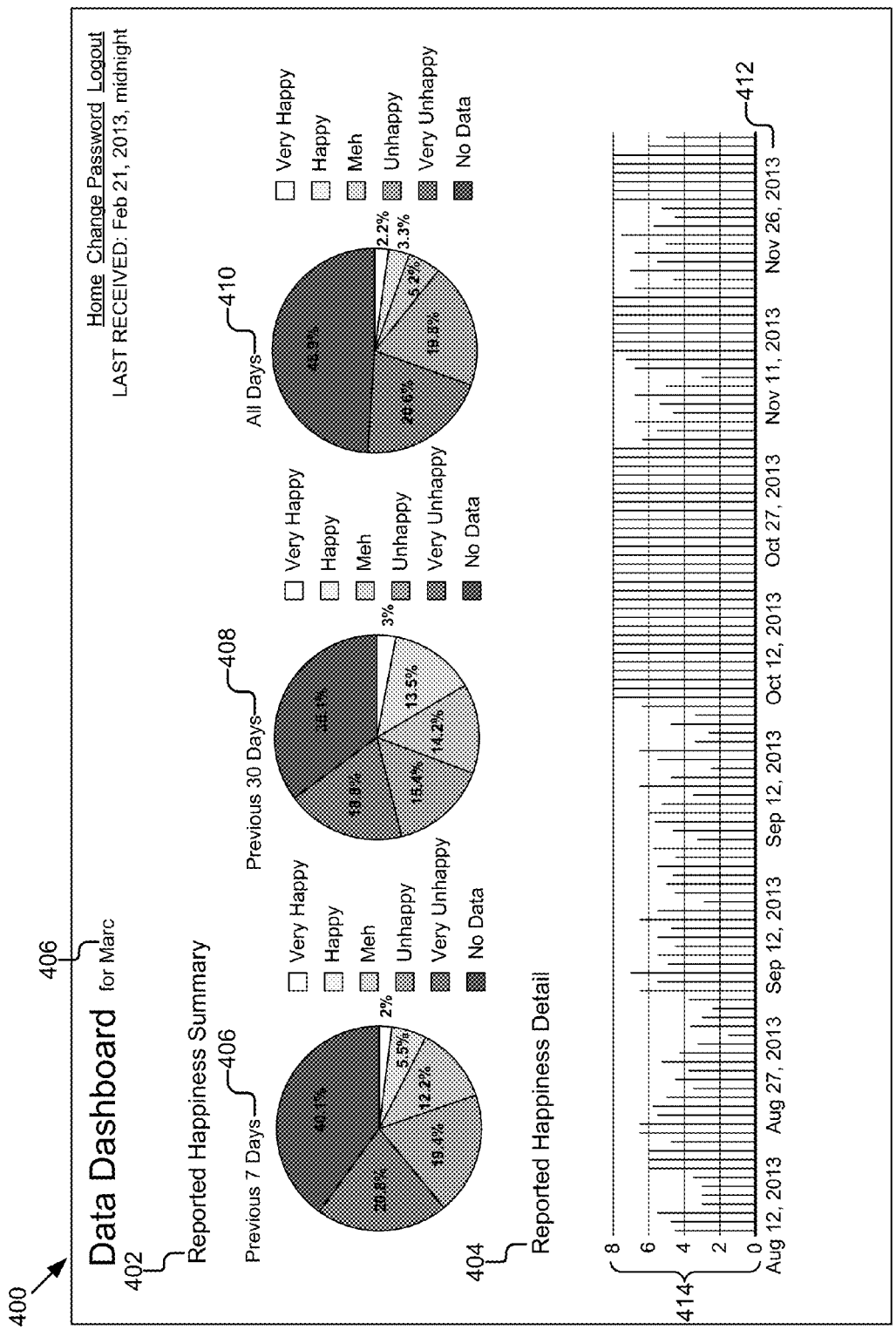
FIG. 4 is example graphical representation of a user interface illustrating visualization of aggregated data in the event stream associated with a user.

FIG. 4 is an example graphical representation of a user interface 400 illustrating visualization of aggregated data in the event stream associated with a user. In the illustrated embodiment, the user interface 400 includes summary visualization 402 of "Happiness" variable ranging from "Very happy" to "Unhappy" and detailed visualization 404 of "Happiness" variable on a scale of 0 to 8 for the user 406. The summary visualization 402 illustrates using pie charts the summary for the last week 406, the summary for the last month 408 and the summary for all days 410. The detailed visualization 404 illustrates using a two dimensional graph with the date 412 on the X axis and the 0-8 range 414 on the Y axis the varying "Happiness" of the user 406 over the course of months.

Figure 5:
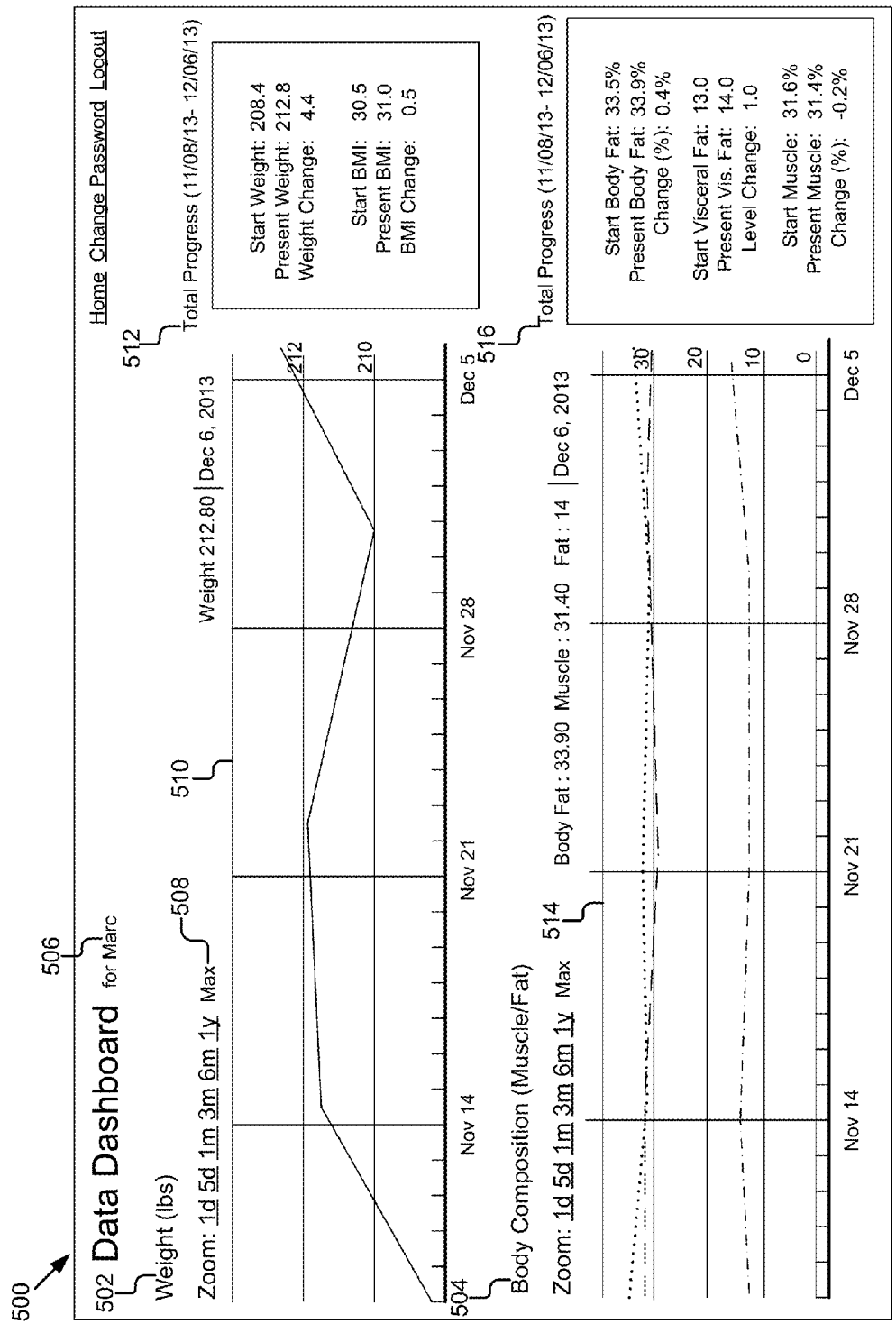
FIG. 5 is another example graphical representation of a user interface illustrating visualization of aggregated data in the event stream associated with a user.

FIG. 5 is another example graphical representation of a user interface 500 illustrating visualization of aggregated data in the event stream associated with a user. In the illustrated embodiment, the user interface 500 includes a visualization of aggregated data weight 502 and body composition 504 for the user 506 over a period of time. The user interface 500 provides a granularity scale 508 to analyze and visualize the aggregated data weight 502 and body composition 504 over a selection of time periods, for example, a day, a month, a year, etc. The user interface 500 refreshes a first two dimensional graph 510 that plots the change in weight 502 against the period of time selected for visualization and displays weight statistics 512 illustrating total progress during that period of time. For example, the weight 502 of the user is visualized in the two dimensional graph 510 for a period starting Nov. 8, 2013 to Dec. 6, 2013 and weight statistics 512 describe change in weight and body mass index (BMI) over the same time period. Similarly, the user interface 500 refreshes a second two dimensional graph 514 that plots the change in body composition 504 against the time period selected for visualization and displays body composition statistics 516 illustrating total progress during that time period. For example, the body fat, muscle and visceral fat of the user is visualized in the two dimensional graph 514 for the same period starting Nov. 8, 2013 to Dec. 6, 2013 and body composition statistics 516 describe change in body fat, visceral fat and muscle over the same period.

Figure 6:
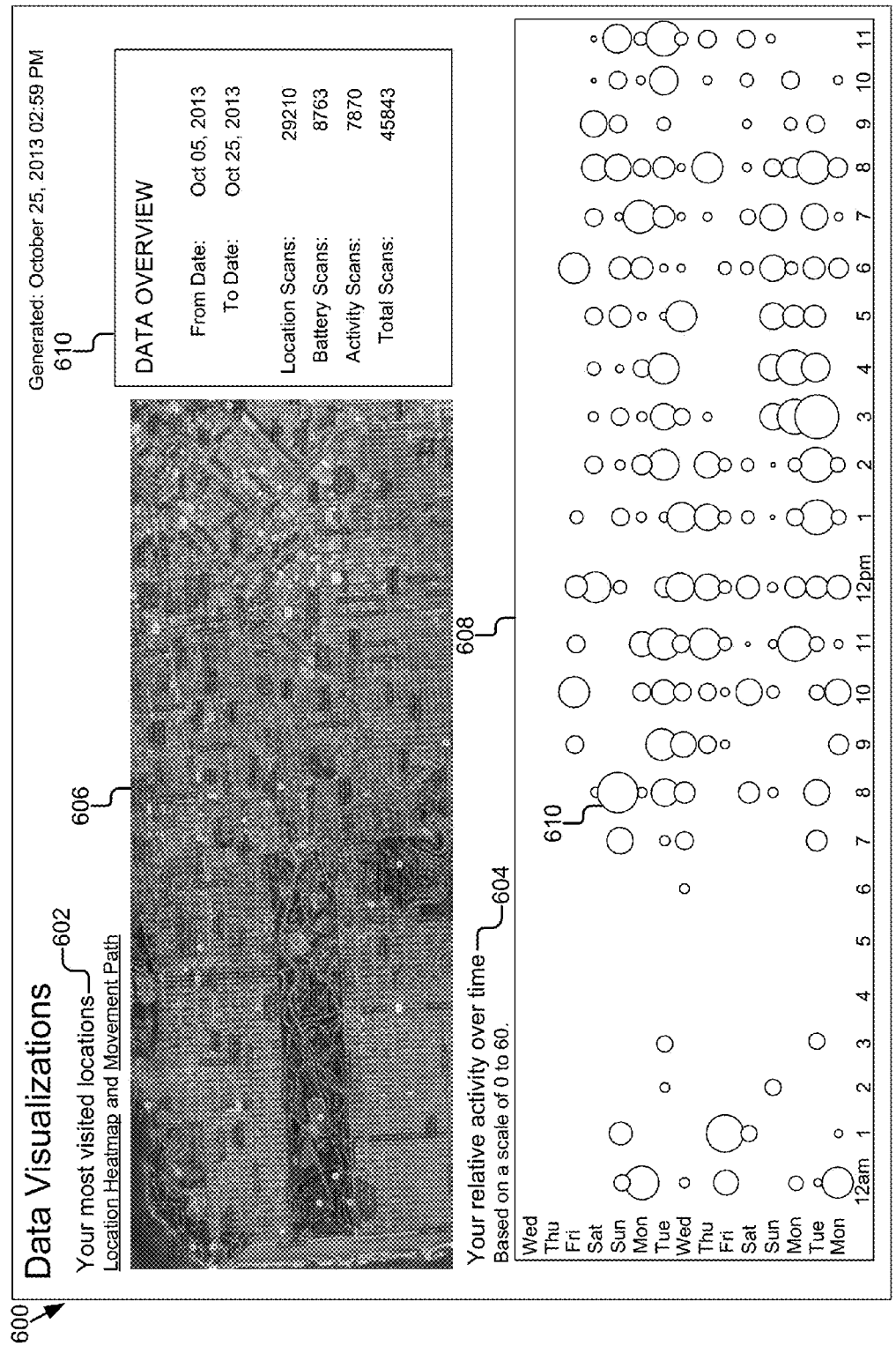
FIG. 6 is an example graphical representation of a user interface illustrating visualization of analytics data associated with a user.

FIG. 6 is an example graphical representation of a user interface 600 illustrating visualization of analytics data associated with a user. In the illustrated embodiment, the user interface 600 includes visualization of analytics data associated with a user's most visited locations 602 and relative activity 604 over time. In addition, the user interface 600 includes an overview 610 describing the time period the data was aggregated and types of data aggregated for analysis. The visualization of most visited locations 602 includes a geographical map 606 of the visited locations during a specific time period. The visualization of relative activity 604 illustrates using a graph 608 describing the relative activity of the user with the days of the week on the Y axis and the time of the day on the X axis. The graph 608 includes a plot point 610. The bigger the plot point 610, the bigger the activity of the user. The size of a plot point 610 on the graph 608 could describe, for example, how many user events happened at that hour on that day, how many people the user was with socially, etc.

Figure 7:
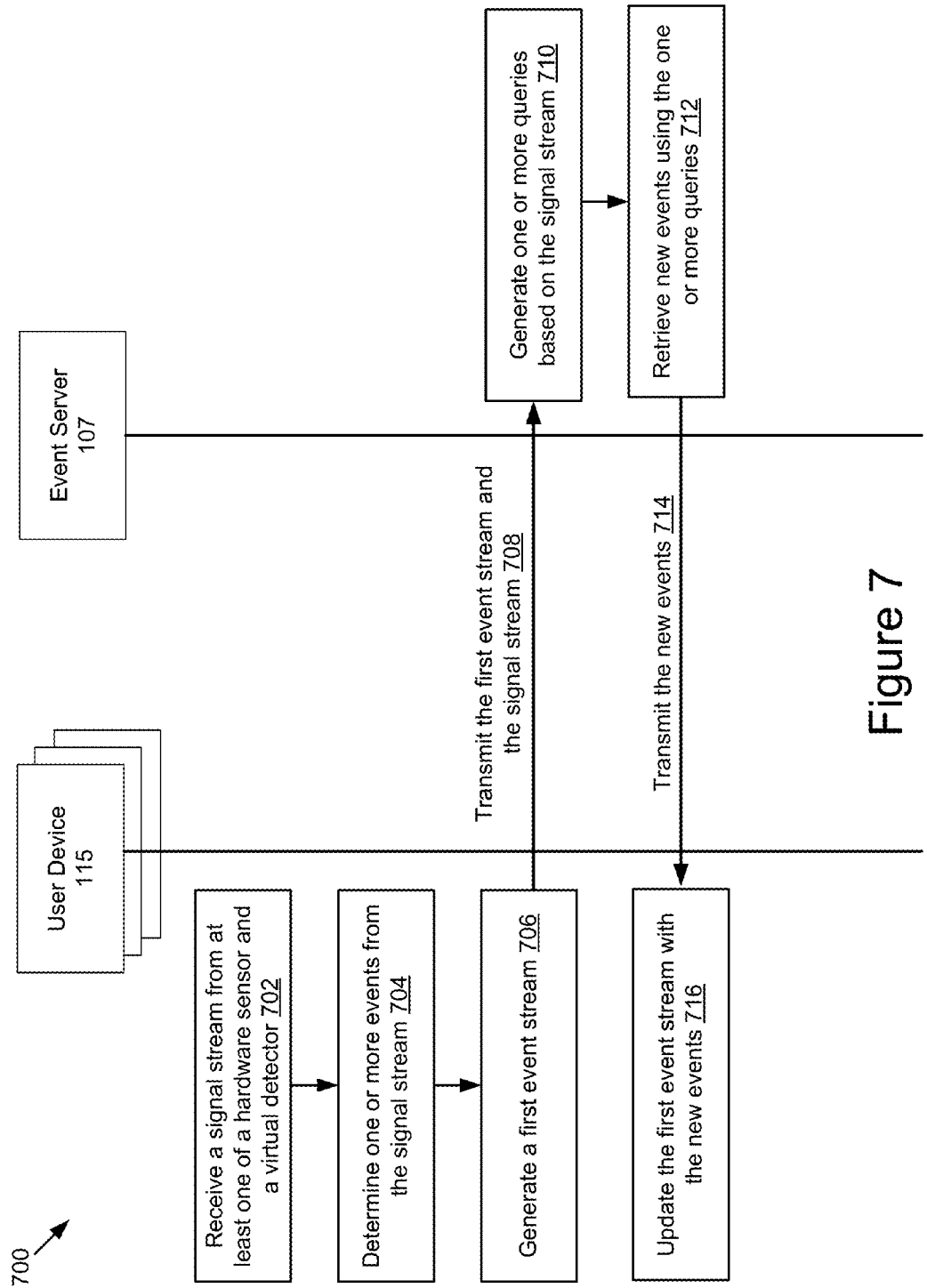
FIG. 7 is a flow diagram of an example of a method for updating an event stream.

FIG. 7 is a flow diagram 700 of an example of a method for updating an event stream. In some embodiments, the event application 103 includes an event detector 206, a stream generator 208 and a syncing engine 210. In other embodiments, the event application 103 includes an analytics engine 261. The event detector 206 receives 702 a signal stream from one or more hardware sensors 252 and/or virtual detector 202. The signal stream includes, for example, step data from an accelerometer, location and velocity data from a GPS sensor, application usage information from an application manager, etc. The event detector 206 determines 704 one or more events from the signal stream. For example, an event can be a run through a park for a number of miles in a period of time, going on a vacation, attending a party, etc. The stream generator 208 generates 706 a first event stream and transmits 708 the first event stream and the signal stream to the event server 107. An event stream can be data describing a temporal sequence of one or more events associated with the user. An event stream includes one or more events organized in a chronological order. The analytics engine 261 generates 710 one or more queries based on the signal stream. The analytics engine 261 retrieves 712 new events using the one or more queries and transmits 714 the new events to the user device 115. For example, the analytics engine 261 receives an event stream including Bluetooth and WiFi proximity data that indicates a mobile device in close proximity. The proximity data includes a hashed identifier associated with the mobile device that is detected. The analytics engine 261 uses the hashed identifier as a query to retrieve the identity of the person to whom the mobile device is registered, such as, a friend, spouse, colleague, etc. The syncing engine 210 updates 716 the first event stream with the new events.

Figure 8:
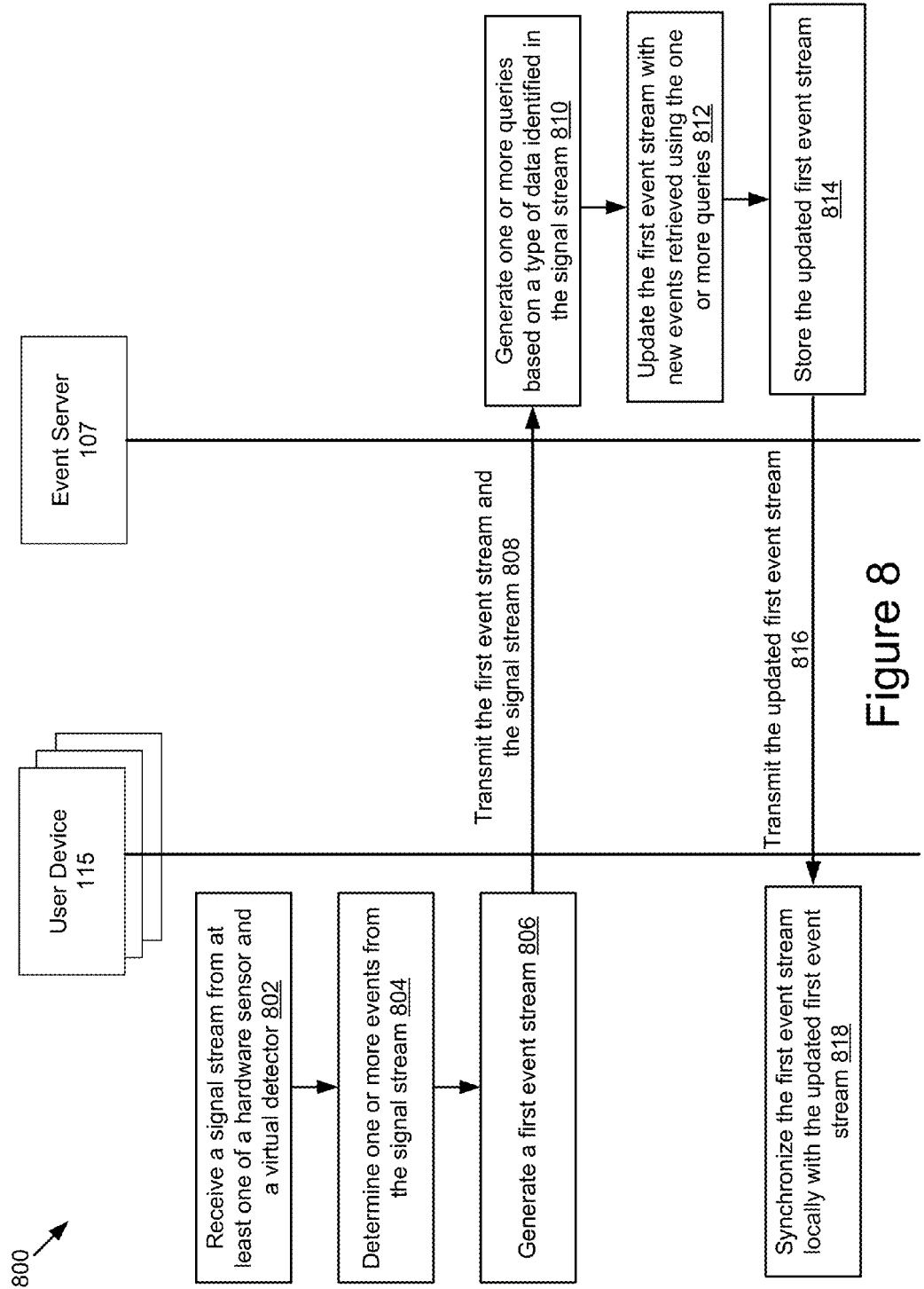
FIG. 8 is a flow diagram of another example of a method for updating an event stream.

FIG. 8 is a flow diagram 800 of another example of a method for updating an event stream. In some embodiments, the event application 103 includes an event detector 206, a stream generator 208 and a syncing engine 210. In other embodiments, the event application 103 includes an analytics engine 261 and a stream generator 263. The event detector 206 receives 802 a signal stream from one or more hardware sensors 252 and/or virtual detector 202. In some embodiments, the signal stream received is a filtered signal stream. An example filtered signal stream from a GPS sensor includes (1) a first set of location and timestamp describing the user arrived at a coffee shop at 8:04 AM and (2) a second set of location and timestamp data describing the user left the coffee shop at 8:30 AM. Other sets of location and timestamp data received from the GPS sensor between 8:00 AM and 8:30 AM are not included in the filtered signal stream because they are identical. The event detector 206 determines 804 one or more events from the signal stream. For example, the event detector 206 generates a social event for the user's graduation party including the user meeting with people (e.g., siblings, friends, friend of a friend, etc.), dining at a restaurant together and uploading pictures of the celebration to the social network on a Friday evening from 7 PM to 11 PM. The stream generator 208 generates 806 a first event stream and transmits 808 the first event stream and the signal stream to the event server 107. The analytics engine 261 generates one or more queries based on type of data identified in the signal stream. The stream generator 263 updates 812 the first event stream with new events retrieved using the one or more queries. The stream generator 263 stores 814 the updated first event stream. For example, the stream generator 263 receives a first event stream with photographs of a graduation party from a first user. The stream generator 263 receives identity of a second user (e.g., a friend of the first user) detected in close proximity and a second event stream including photographs taken by the second user at the graduation party. The stream generator 263 updates the first event stream with photographs from the second event stream and generates an updated first event stream. The stream generator 263 transmits 818 the updated first event stream to the user device 115. The syncing engine 210 synchronizes 818 the first event stream locally with the updated first event stream.

Figure 9:
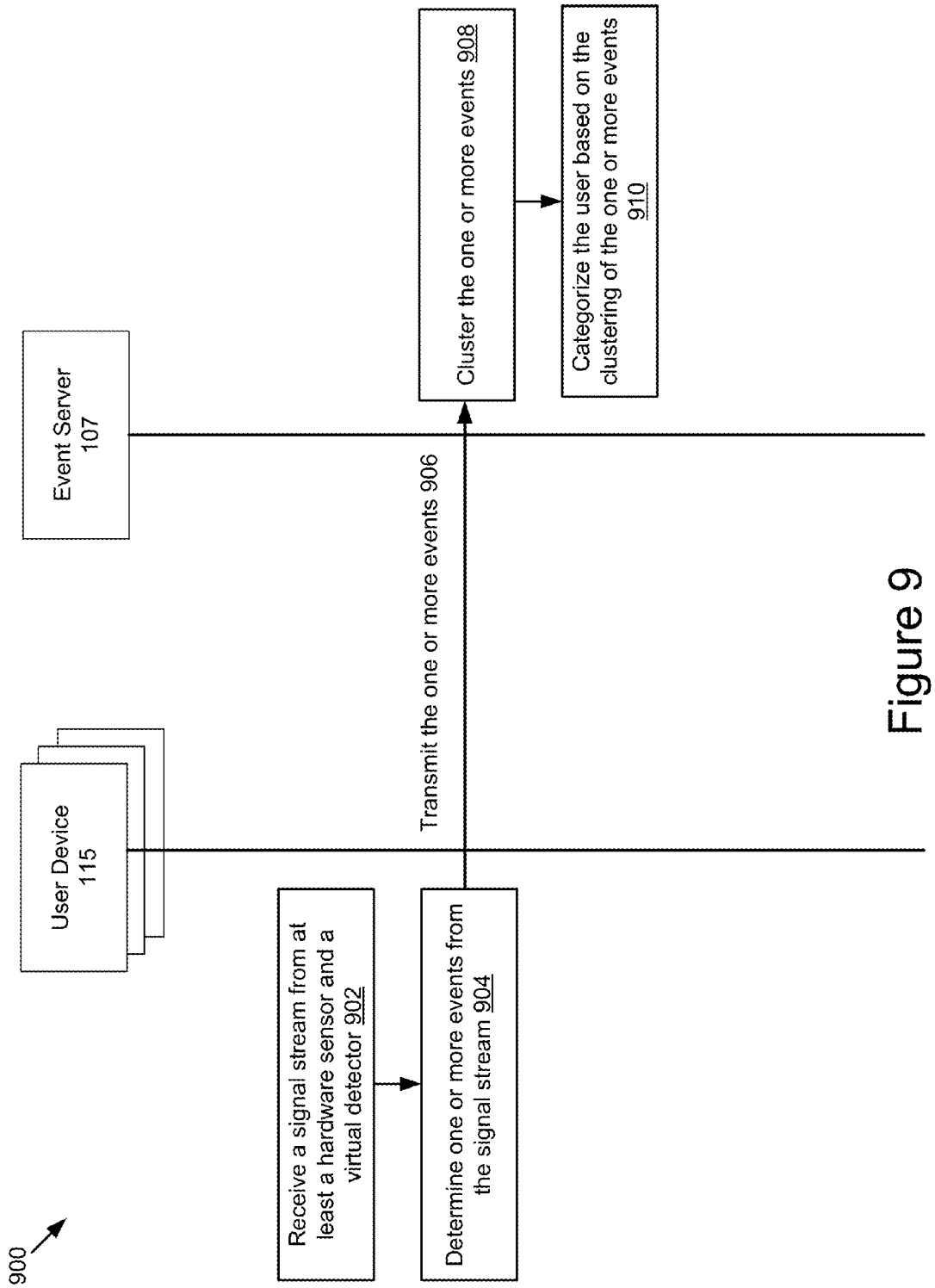
FIG. 9 is a flow diagram of an example of a method for generating analytics data for the event streams.

FIG. 9 is a flow diagram 900 of an example of a method for generating analytics data for the event streams. In some embodiments, the event application 103 includes an event detector 206. In other embodiments, the event application 103 includes an analytics engine 261. The event detector 206 receives 902 a signal stream from one or more hardware sensors 252 and/or virtual detector 202. The event detector 206 determines one or more events from the signal stream and transmits 906 the one or more events. The analytics engine 261 clusters 908 the one or more events. The analytics engine 261 categorizes 910 the user based on the clustering of the one or more events. For example, the analytics engine 261 clusters the user's most visited locations (i.e. events) and categorize what kind of a person the user is. If the user's top locations are clustered in the following order: university campus (54%), student housing (30%), coffee shop (5%), bowling alley (3%), gym (3%), snow resort (2%), shopping malls (2%) and hospital clinic (1%), the analytics engine 261 categorizes the user as a student.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, from a first user device associated with a first user, a signal stream automatically generated by the first user device, the signal stream including first data that identifies a second user device detected by a sensor of the first user device as being present within a detection range of the sensor of the first user device;
receiving, from the first user device, a first event stream including a first event associated with the first user, the first event generated by the first user device based upon first activities of the first user, the first activities of the first user determined by the first user device based on the signal stream;
determining a second user associated with the second user device based on the first data included in the signal stream;
determining whether the second user has a connection with the first user on an online service;
responsive to determining that the second user has the connection with the first user on the online service and the second user device is detected by the sensor of the first user device as being present within the detection range of the sensor of the first user device, retrieving a second event stream associated with the second user and including one or more events generated by the second user device;
identifying, from the one or more events in the second event stream, a second event based on a comparison to the first event associated with the first user;

transmitting, to the first user device, the second event associated with the second user and an instruction that causes the first user device to include the second event associated with the second user in the first event stream associated with the first user on the first user device;

updating the first event stream of the first user with the second event associated with the second user to generate a third event stream; and transmitting, to the first user device, the third event stream and an instruction that causes the first user device to synchronize the first event stream on the first user device with the third event stream.

2. The method of claim 1, wherein the second event stream associated with the second user is retrieved from a data storage, and the method includes:

determining a timestamp associated with the first event of the first user; and indexing the first event of the first user in the data storage based on the timestamp.

3. The method of claim 1, wherein identifying the second event associated with the second user includes:

determining a timestamp associated with the first event of the first user; and identifying the second event from the one or more events in the second event stream based on the timestamp.

4. The method of claim 1, wherein the first event stream includes a plurality of events associated with the first user, and the method includes:

clustering the plurality of events associated with the first user of the first user device; and categorizing the first user based on the clustering of the plurality of events.

5. The method of claim 1, further comprising:

determining a location of the first user based on the signal stream; and categorizing the second user based on the location of the first user.

6. The method of claim 1, further comprising:

generating analytics data for the first user based on the signal stream; and transmitting for display a visualization of the analytics data to the first user device.

7. The method of claim 6, wherein generating the analytics data for the first user further comprises:

receiving, from the first user, a selection of a time period; and generating the analytics data for the first user corresponding to the selected time period.

8. The method of claim 6, wherein the visualization of the analytics data includes a geographical map pinpointing a location associated with the first event generated by the first user device.

9. The method of claim 1, wherein transmitting the second event associated with the second user and the instruction that causes the first user device to include the second event associated with the second user in the first event stream further comprises:

determining the one or more events included in the second event stream associated with the second user;

determining an overlapping event between the first user and the second user in the one or more events; and responsive to determining the overlapping event, transmitting the second event associated with the second user and the instruction that causes the first user device to include the second event associated with the second user in the first event stream.

10. The method of claim 1, wherein determining the second user associated with the second user device based on the first data included in the signal stream comprises:

generating a query based on the first data in the signal stream; and using the query to determine the second user and the second user device.

11. A system comprising:

a processor;

a data storage coupled to the processor; and a memory storing instructions that, when executed, cause the system to:

receive, from a first user device associated with a first user, a signal stream automatically generated by the first user device, the signal stream including first data that identifies a second user device detected by a sensor of the first user device as being present within a detection range of the sensor of the first user device;

receive, from the first user device, a first event stream including a first event associated with the first user, the first event generated by the first user device based upon first activities of the first user, the first activities of the first user determined by the first user device based on the signal stream;

determine a second user associated with the second user device based on the first data included in the signal stream;

determine whether the second user has a connection with the first user on an online service;

responsive to determining that the second user has the connection with the first user on the online service and the second user device is detected by the sensor of the first user device as being present within the detection range of the sensor of the first user device, retrieve a second event stream associated with the second user and including one or more events generated by the second user device;

identify, from the one or more events in the second event stream, a second event based on a comparison to the first event associated with the first user;

transmit, to the first user device, the second event associated with the second user and an instruction that causes the first user device to include the second event associated with the second user in the first event stream associated with the first user on the first user device;

update the first event stream of the first user with the second event associated with the second user to generate a third event stream; and transmit, to the first user device, the third event stream and an instruction that causes the first user device to synchronize the first event stream on the first user device with the third event stream.

12. The system of claim 11, wherein the second event stream associated with the second user is retrieved from the data storage, and wherein the instructions, when executed, cause the system to:

determine a timestamp associated with the first event of the first user; and index the first event of the first user in the data storage based on the timestamp.

13. The system of claim 11, wherein to identify the second event associated with the second user, the instructions, when executed, cause the system to:

determine a timestamp associated with the first event of the first user; and identify the second event from the one or more events in the second event stream based on the timestamp.

14. The system of claim 11, wherein the first event stream includes a plurality of events associated with the first user, and wherein the instructions, when executed, cause the system to:
 cluster the plurality of events associated with the first user of the first user device; and
 categorize the first user based on the clustering of the plurality of events.

15. The system of claim 11, wherein the instructions, when executed, cause the system to:
 determine a location of the first user based on the signal stream; and
 categorize the second user based on the location of the first user.

16. The system of claim 11, wherein the instructions, when executed, cause the system to:
 generate analytics data for the first user based on the signal stream; and
 transmit for display a visualization of the analytics data to the first user device.

17. The system of claim 16, wherein to generate the analytics data for the first user, the instructions, when executed, cause the system to:
 receive, from the first user, a selection of a time period; and
 generate the analytics data for the first user corresponding to the selected time period.

18. The system of claim 16, wherein the visualization of the analytics data includes a geographical map pinpointing a location associated with the first event generated by the first user device.

19. The system of claim 11, wherein to transmit the second event associated with the second user and the instruction that causes the first user device to include the second event associated with the second user in the first event stream, the instructions, when executed, cause the system to:
 determine the one or more events included in the second event stream associated with the second user;
 determine an overlapping event between the first user and the second user in the one or more events; and
 responsive to determining the overlapping event, transmit the second event associated with the second user and the instruction that causes the first user device to include the second event associated with the second user in the first event stream.

* * * * *